Figure 1:
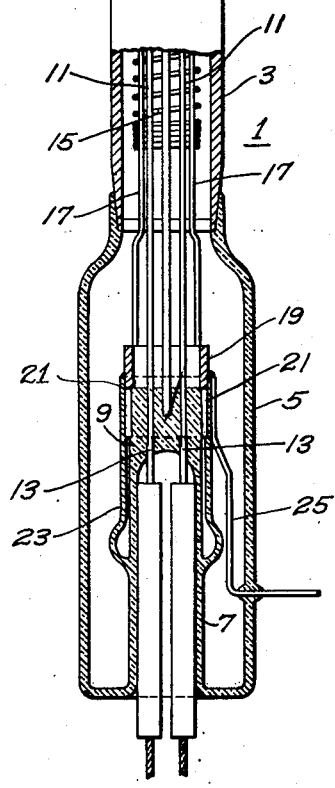

Aug. 28, 1934.   D. L. ULREY   1,971,837
TUNGSTEN SEAL
Filed Feb. 19, 1932

WITNESSES:

INVENTOR
Dayton Ulrey.
BY
ATTORNEY

UNITED STATES PATENT OFFICE 1,971,837

TUNGSTEN SEAL

Dayton L. Ulrey, Forest Hills, Pa., assignor to Westinghouse Electric & Manufacturing Company, a corporation of Pennsylvania Application February 19, 1932, Serial No. 593,951

15 Claims. (Cl. 250—27.5)

My invention relates to metallic seals for evacuated containers and has particular relation to seals made between a vitreous substance such as glass and metals such as tungsten or molybdenum.

The principal features of my invention were developed in connection with experimental work which I carried out on the problem of providing suitable seals for hot cathode electric discharge devices capable of delivering considerable power at high frequencies. In hot cathode electric discharge devices, particularly of the high vacuum type, that are capable of delivering considerable power the heating current for the cathode is comparatively high. In consequence thereof, the glass wherein the cathode leads are sealed must be of a type the softening temperature of which is high. On the other hand, since it is desirable that the lead-in wires be maintained at as low a temperature as possible these wires should be of high electrical conductivity and as a result it is desirable that they should be preferably tungsten and on some occasions molybdenum.

I have found that when ordinary glass is utilized for the purpose of sealing in power electric discharge devices of the high vacuum type in accordance with the teachings of the prior art, the glass must be carefully annealed. If the annealing process is not carried out with care and diligence the seal cracks when the glass becomes heated by reason of the currents conducted by the lead-in wires. I have moreover observed that in seals constructed in accordance with the teachings of the prior art the dielectric loss is considerable.

Finally, I have noted that the glass that is ordinarily utilized for sealing purposes is comparatively expensive and as a result, the problem which arises in connection with such a glass is that it be easily fusible with less expensive glass that commonly has a greater coefficient of expansion than the glass utilized in the seal. In accordance with the teachings of the prior art, a so-called graded seal is utilized in this connection. The glass of the seal is fused to a strip composed of glass having a greater thermal coefficient of expansion than itself, the latter strip being in turn fused to a second strip composed of glass of still greater coefficient of expansion, etc., until the coefficient of expansion of the cheap glass of which it is desirable to make a greater portion of the container of the electric discharge device is attained.

It is accordingly an object of my invention to provide a seal wherein a vitreous substance fusible to metals of the type of tungsten or molybdenum with facility is utilized.

Another object of my invention is to provide a seal incorporating a vitreous substance that has a comparatively high softening point but that is workable with facility for purposes of sealing.

Still another object of my invention is to provide a seal particularly adaptable to be utilized in electric discharge devices where the heating of the vitreous substance by reason of the effects of the input and output currents on the leads of the device is considerable.

A further object of my invention is to provide for an electric discharge device for the type capable of delivering considerable power, a seal incorporating a vitreous substance that shall require little care in the annealing process following the sealing process.

A still further object of my invention is to provide for an electric discharge device of the high vacuum type that is capable of being utilized for purposes of delivering high frequency power, a seal of the type wherein the dielectric loss shall be a minimum.

An additional object of my invention is to provide for a high vacuum container a metallic seal incorporating a vitreous substance that shall fuse with vitreous substances of different thermal co-efficients of expansion with facility.

An incidental object of my invention is to provide for a metallic seal to be utilized in a high vacuum container a vitreous substance having a low thermal coefficient of expansion.

More concisely stated, it is an object of my invention to provide a seal particularly usable in electric discharge devices of the high vacuum type capable of delivering considerable power at a comparatively high frequency that shall be inexpensive to manufacture and incorporate in a container and that shall require little servicing and replacement when once incorporated in a container.

According to my invention I provide a seal comprising tungsten wire fused in a glass having the trade name of G-707-DG. The glass is composed largely of the oxides of silicon and boron, of detectable quantities of oxides of arsenic, aluminum, iron, calcium, magnesium, sodium and potassium and of a trace of the oxide of lead. It has a coefficient of expansion of the order of $2.8 \times 10^{-6}$ or less. The dielectric loss of the glass when compared to vitreous substances of other types such as "Corex" or "Pyrex" glass is comparatively small.

As far as the care in annealing the glass is concerned I have found that it responds to differences in temperature in a manner similar to quartz. I have several times sealed a bead of the glass to a wire and have found that the bead may be heated to a glowing point and immediately dipped into cold water without any deleterious effects on the glass. As far as I am aware, quartz is the only other substance of a similar type that has this property. I have also found that while the glass has a high softening point, it may be worked with facility and easily wets such metals as tungsten and molybdenum.

The chief feature of the glass that is utilized in sealing in accordance with my invention resides in the comparatively large percentages of the oxides of silicon and boron that are utilized and the comparatively small percentages of the other elements. It should, however, be noted that I can only theorize as to the particular elements or features of the glass that cause it to have the desirable properties which I have ascribed to it hereinabove and that glass of a composition varying slightly from the composition of the glass utilized in accordance with my invention, when applied for sealing purposes, should lie within the scope of my invention.

It is to be noted that in my improved seal tungsten or molybdenum wires are utilized as leads. These elements have a thermal coefficient of expansion which is greater than $3 \times 10^{-6}$ and in accordance with the teachings of the prior art the glass utilized for sealing purposes with leads of this type should have an equivalent thermal coefficient of expansion. It is a feature of my invention that the glass utilized in my seal has a thermal coefficient of expansion which is less than $3 \times 10^{-6}$ and in fact less than $2.8 \times 10^{-6}$.

The novel features that I consider characteristic of my invention are set forth with particularity in the appended claims. The invention itself, however, both as to its organization and its method of operation, together with additional objects and advantages thereof will best be understood from the following description of a specific embodiment when read in connection with the accompanying drawing, in which, Figure 1 is a view, partly in section and partly in side elevation, showing an electric discharge device in which a seal in accordance with my invention is utilized, and Fig. 2 is a graph showing the relation between the power factor (a function of the dielectric loss as shall be explained hereinafter) inherent in the glass utilized in sealing in accordance with my invention and vitreous substances of other types.

Figure 2:
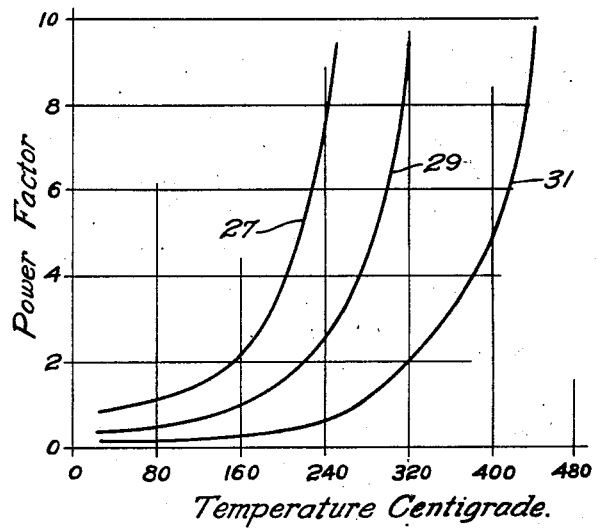

The electric discharge device shown in Fig. 1 comprises an evacuated envelope 1, the upper region of which is a metallic tube 3 and the lower region of which is a container 5 composed of a vitreous substance. The lower container 5 is equipped with a reentrant stem 7 and a press 9. The press 9 is preferably composed of G-707-DG glass and is fused to the stem 7. The stem is in turn fused to the body of the container 5. The boundary of the open end of the container is sealed to the boundary of the open end of the tube 3.

The heating current for the filament 11 of the electric discharge device is fed through a plurality of tungsten leads 13 that are sealed in the press 9. The grid 15 of the electric discharge device is secured to a plurality of rods 17 that are in turn secured to a collar 19 mounted on the press 9 that makes contact with a second collar 21 mounted on a cylindrical shell 23 that is fused to the stem 7.

A tungsten wire 25 is welded to the collar 21 and is sealed to the vitreous container 5. The grid voltage is applied through the tungsten wire. The cylindrical tube 3 performs the function of the plate of the electric discharge device.

The glass utilized for the press and for the portion of the container wherein the tungsten wire is sealed is as has been explained above of the type known as G-707-DG and has substantially the following composition:

| | Per cent |
|---|---|
| $SiO_2$ | 70.55 |
| $B_2O_3$ | 25.22 |
| $Na_2O$ | 2.07 |
| $Al_2O_3$ | 1.07 |
| $K_2O$ | .41 |
| $As_2O_3$ | .38 |
| MgO | .20 |
| CaO | .07 |
| $Fe_2O_3$ | .03 |
| PbO | Trace |

If the procedure is found to be desirable the portion of the container 5 above the tungsten seal as well as the stem 7 may be composed of a vitreous substance other than the glass specified. The glass utilized for sealing purposes in accordance with my invention fuses rather easily with other glass such as "Pyrex" or "Nonex." Consequently, if it is found desirable to provide a plate 3 composed of a metal that does not wet the glass utilized in sealing the leads or if it is found desirable to utilize a glass less expensive than is utilized for the purpose of sealing the leads, such glass may be fused to the container directly above the tungsten seal.

It is to be kept in mind that while I have described the seal constructed in accordance with my invention as utilized for a tube of a particular type it is equally as well applicable to tubes of all other types be they gas filled high vacuum or vapor tubes. My invention is, therefore, not to be restricted to the tube specifically described.

In Fig. 2 a graph is plotted showing the relationship between the dielectric loss encountered in the glass utilized in the practice of my invention and the dielectric loss encountered in vitreous substances of other types. In this view the power factor, represented by the ratio of the dielectric loss to the VA impressed on the glass when it is used as the dielectric of a condenser, is plotted as ordinate while the temperature of the glass is plotted as abscissa. The measurements from which the graph is plotted were taken at a frequency of 1,000,000 cycles per second.

It is to be noted that the phrase "power factor" is used hereinabove in its ordinary sense. The term is defined customarily as the power consumed in a network (i. e., the power dissipated in heat energy) divided by the product of the volts applied to the network by the amperes transmitted therethrough. In the above case, the network is a condenser of which the glass is the dielectric. The power dissipated in the circuit is, therefore, simply the power consumed in supplying energy to the dielectric and is best represented by the so called dielectric loss.

The curve 27 on the extreme left shows the power factors of "Pyrex" glass as a function of temperature. The central curve 29 shows power the factor for "Nonex" glass, which is commonly known as G-702-P, and the curve 31 on the extreme right shows the power factor as a function of temperature for the G-707-DG glass. It will be noted that at 240° the glass utilized in the practice of my invention has a power factor of less than 2% and at 400° it has a power factor of less than 6%.

Attention is called to the fact that the curves shown in Fig. 2 graphically illustrate a property of the glass which has an important bearing on its utility for sealing purposes in an electric discharge device. Since under ordinary circumstances, the leads of an electric discharge device are sealed in spaced relationship in a container and a difference of potential, often of high frequency, is impressed between them, the situation which arises is entirely analogous to the situation which was involved in the apparatus whereby the data from which Fig. 2 is plotted was obtained. In an electric discharge device, one or more condensers are formed between the leads and their appurtenant elements of which the glass utilized for sealing purposes is the dielectric. The dielectric loss of the glass in the seal is a measure of the rapidity with which the glass will become heated under a given set of circumstances and, therefore, is a measure of the utility of the glass for sealing purposes.

Thus, in the present case, condensers are formed between the leads 13 (Fig. 1) and their appurtenant elements and the collars 19 and 21 and also between the lead 25 and the collars 19 and 21 and the anode 3. The glass utilized for sealing purposes is the dielectric of the condensers.

Where the seal is graded, as it may be between the lead 25 (Fig. 1) and the anode 3 low dielectric loss is still a desirable property. In such a case, the dielectric of the condenser is the graded glass composition and when a difference of potential of high frequency is applied between the electrodes the glass will heat up in accordance with its dielectric loss. If the dielectric loss in the region of the seal, in which even under most advantageous circumstances a strained condition exists, is high, the glass in this region will rapidly become hot and the electric discharge device will frequently be fractured.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. An electric discharge device at least one region of which consists of a boro-silicate glass having a coefficient of expansion of at most $2.8 \times 10^{-6}$ and a tungsten conductor sealed in said region.

2. An electric discharge device at least one region of which consists of a boro-silicate glass having a coefficient of expansion of at most $2.8 \times 10^{-6}$ and a conductor of the tungsten type sealed in said region.

3. An electric discharge device at least one region of which consists of a vitreous substance composed of at least 70% silica, 25% boron oxide and 2% alkaline oxides, and a wire of the tungsten type sealed in said region.

4. An electric discharge device at least one region of which consists of a vitreous substance composed at least of 70% silica, 25% boron oxide, 2% alkaline oxide and 1% alumina and a wire of the tungsten type sealed in said region.

5. An electric discharge device at least one region of which consists of a vitreous substance composed at least of 70% silica, 25% boron oxide, 2% sodium oxide and 1% alumina and a wire of the tungsten type sealed in said region.

6. An electric discharge device at least one region of which consists of a vitreous substance composed of at least 70% silica, 25% boron oxide, 2% sodium oxide and a wire of the tungsten type sealed in said region.

7. An electric discharge device at least one region of which consists of a vitreous substance composed at least 70% of silica, 25% of boron oxide, 2% of sodium oxide, 1% of alumina, and less than 1% of detectable quantities of potassium oxide and a metallic tungsten element sealed in said region.

8. An electric discharge device at least one region of which consists of a vitreous substance composed at least 70% of silica, 25% of boron oxide, 2% of sodium oxide, 1% of alumina, and less than 1% of detectable quantities of potassium oxide and at least one oxide of the alkaline earths and a metal of the tungsten type sealed in said region.

9. An electric discharge device at least one region of which consists of a vitreous substance composed at least 70% of silica, 25% of boron oxide, 2% of sodium oxide, 1% of alumina, and less than 1% of detectable quantities of potassium oxide, at least one oxide of the alkaline earth and iron trioxide and a metal of the tungsten type sealed in said region.

10. An electric discharge device at least one region of which consists of a vitreous substance composed at least 70% of silica, 25% of boron oxide, 2% of sodium oxide, 1% of alumina, less than 1% of detectable quantities of potassium oxide, at least one oxide of the alkaline earth and iron trioxide and a trace of lead oxide and a metal of the tungsten type sealed in said region.

11. An electric discharge device at least one region of which consists of a vitreous substance composed at least 70% of silica, 25% of boron oxide, 2% of sodium oxide, 1% of alumina, less than 1% of detectable quantities of potassium oxide, magnesium oxide, calcium oxide and iron trioxide and a trace of lead oxide and a metal of the tungsten type sealed in said region.

12. An electric discharge device at least one region of which consists of a vitreous substance having the following composition, silica 70.55%, boron oxide 25.22%, sodium oxide 2.07%, alumina 1.07%, potassium oxide .41%, arsenic trioxide 33%, magnesium oxide .20%, calcium oxide .07% and a trace of lead oxide and a metallic tungsten element sealed in said region.

13. An electric discharge device at least one region of which consists of a vitreous substance composed at least 70% of silica, 25% of boron oxide, 2% of sodium oxide, 1% of alumina, and less than 1% of detectable quantities of potassium oxide, at least one oxide of the alkaline earth, iron trioxide and arsenic trioxide and a metal of the tungsten type sealed in said region.

14. An electric discharge device at least one region of which consists of a vitreous substance composed at least 70% of silica, 25% of boron oxide, 2% of sodium oxide, 1% of alumina, and less than 1% of detectable quantities of an oxide of arsenic and a metallic tungsten element sealed to said region.

15. In an electric discharge device of the type incorporating a plurality of electrodes immersed in an evacuated medium, an envelope one region of which consists of a boro-silicate glass having a coefficient of expansion of at most $2.8 \times 10^{-6}$ and at least one conductor of the tungsten type sealed in said region.

DAYTON L. ULREY.